United States Patent
Futa et al.

(10) Patent No.: US 8,316,630 B2
(45) Date of Patent: Nov. 27, 2012

(54) FLOW EQUALIZING OVERRIDE ASSEMBLY FOR FUEL DIVIDER SYSTEM

(75) Inventors: Paul Futa, North Liberty, IN (US); David Tuttle, South Bend, IN (US); David Lawrence, South Bend, IN (US)

(73) Assignee: Honeywell International Inc., Morristown, NJ (US)

(*) Notice: Subject to any disclaimer, the term of this patent is extended or adjusted under 35 U.S.C. 154(b) by 1127 days.

(21) Appl. No.: 12/199,328

(22) Filed: Aug. 27, 2008

(65) Prior Publication Data
US 2010/0050593 A1   Mar. 4, 2010

(51) Int. Cl.
*F02C 9/00*   (2006.01)
*F02C 9/26*   (2006.01)

(52) U.S. Cl. .................. 60/39.281; 60/790

(58) Field of Classification Search ........... 60/39.281, 60/734, 739, 741, 790, 240, 740
See application file for complete search history.

(56) References Cited

U.S. PATENT DOCUMENTS

| | | | | |
|---|---|---|---|---|
| 2,643,513 | A * | 6/1953 | Lee, II | 60/39.281 |
| 2,857,739 | A * | 10/1958 | Wright | 60/238 |
| 2,989,842 | A * | 6/1961 | Neal et al. | 60/39.281 |
| 4,041,695 | A * | 8/1977 | Harper et al. | 60/779 |
| 5,809,771 | A * | 9/1998 | Wernberg | 60/39.094 |
| 5,881,550 | A * | 3/1999 | Toelle | 60/39.094 |
| 6,314,998 | B1 * | 11/2001 | Futa et al. | 137/625.12 |
| 6,484,510 | B2 | 11/2002 | Futa, Jr. et al. | |
| 6,751,939 | B2 | 6/2004 | Futa, Jr. et al. | |
| 6,892,544 | B2 * | 5/2005 | Futa et al. | 60/776 |
| 6,941,754 | B2 | 9/2005 | Aldridge et al. | |
| 7,007,452 | B1 * | 3/2006 | Baryshnikov et al. | 60/39.094 |
| 7,093,420 | B2 | 8/2006 | Futa, Jr. et al. | |
| 7,200,985 | B2 * | 4/2007 | Tuttle et al. | 60/39.094 |
| 2005/0279079 | A1 * | 12/2005 | Baryshnikov et al. | 60/39.094 |

* cited by examiner

*Primary Examiner* — Ehud Gartenberg
*Assistant Examiner* — Gerald Sung
(74) *Attorney, Agent, or Firm* — Ingrassia Fisher & Lorenz P.C.

(57) ABSTRACT

A flow equalizing override assembly is provided for use in conjunction with a gas turbine engine (GTE) and a fuel divider system. In one embodiment, the flow equalizing override assembly includes a housing assembly, a fuel divider (FD) valve, a remotely-actuatable valve, and a controller. The FD valve includes: (i) a piston slidably disposed within the housing assembly and movable between a default position and a flow equalizing position, and (ii) a control chamber defined by the piston and the housing assembly. The remotely-actuatable valve is fluidly coupled to the control chamber and is configured to selectively adjust the fuel pressure therein. The controller is configured to command the remotely-actuatable valve to adjust the pressure within the control chamber such that the piston moves from the default position to the flow equalizing position after ignition of the GTE.

19 Claims, 6 Drawing Sheets

FLOW EQUALIZING OVERRIDE ASSEMBLY FOR FUEL DIVIDER SYSTEM

TECHNICAL FIELD

The present invention relates generally to aircraft fuel control systems and, more particularly, to a flow equalizing assembly for use in conjunction with a fuel divider system of the type commonly deployed on an aircraft.

BACKGROUND

A gas turbine engine (GTE) may include multiple sets of nozzles that each deliver burn fuel to a combustion chamber within the GTE. These sets of nozzles may include, for example, a primary set of atomizer nozzles and a secondary set of air blast nozzles. During GTE start-up, it is generally desirable to bias up fuel flow to the atomizer nozzles relative to the air blast nozzles to achieve optimal engine lightoff conditions. However, after GTE start-up, it is generally desirable to provide even pressure and flow to the atomizer nozzles and the air blast nozzles to achieve an evenly distributed burn spray pattern in the combustion chamber. To address this need, fuel divider systems have been developed that bias up the pressure, and therefore the volume, of burn fuel supplied to the atomizer nozzles as a function of total metered burn fuel volume. When little burn fuel is supplied to the system during GTE start-up, the fuel divider system provides a relatively large pressure bias, and thus flow distribution, in favor of the atomizer nozzles. This bias decreases as the total burn fuel supplied to the system increases and ultimately disappears at a predetermined flow rate associated with typical engine run conditions, such as engine cruise. In this manner, the fuel divider system biases up fuel flow to the atomizer nozzles during engine lightoff conditions, while providing an equalized flow to the atomizer nozzles and the air blast nozzles during moderate to high flow engine run conditions.

Fuel divider systems of the type described above may further include an ecology valve. Upon cessation of GTE operation, the ecology valve removes a predetermined volume of burn fuel from the engine fuel manifold. In so doing, the ecology valve decreases the volume of fuel available for vaporization to the atmosphere and deters coking of the atomizer and air blast nozzles. When GTE operation is again initiated, the ecology valve returns the withdrawn fuel to the fuel engine manifold for combustion.

Although addressing the need to bias up fuel flow to the atomizer nozzles during engine start-up, conventional fuel divider systems of the type described above are limited in certain respects. As previously explained, such fuel divider systems bias up the pressure of the burn fuel supplied to the atomizer nozzles as a function of total burn fuel supplied to the system; consequently, such fuel divider systems also bias up the pressure of the burn fuel supplied to the atomizer nozzles during certain post start-up conditions, such as flight idle, wherein relatively little burn fuel is supplied to the fuel divider system and GTE. Unequal fuel distribution during such low flow post start-up conditions may result in an uneven burn spray pattern, which, in turn, may lead to heat-induced engine combustor distress in areas adjacent the atomizer nozzles. As a further limitation, fuel divider systems of the type described above permit the ecology valve to move, and thus prematurely reintroduce burn fuel to the engine fuel manifold, during GTE start-up procedures and potentially compromise ideal GTE start flow conditions.

It is thus desirable to provide a flow equalizing override assembly capable of being remotely actuated at a desired time (e.g., upon detection of GTE ignition) to equalize the flow output of a fuel divider system and thereby provide equalized flow to primary and secondary nozzles during post start-up conditions including low flow post start-up conditions, such as flight idle. It would also be desirable if, in embodiments wherein the override assembly is utilized in conjunction with a fuel divider system including an ecology valve, the flow equalizing override assembly permits ecology valve movement only after the override assembly has been remotely actuated and GTE start-up has been achieved. Other desirable features and characteristics of the present invention will become apparent from the subsequent Detailed Description and the appended claims, taken in conjunction with the accompanying drawings and this Background.

BRIEF SUMMARY

A flow equalizing override assembly is provided for use in conjunction with a gas turbine engine (GTE) and a fuel divider system. In one embodiment, the flow equalizing override assembly includes a housing assembly, a fuel divider (FD) valve, a remotely-actuatable valve, and a controller. The FD valve includes: (i) a piston slidably disposed within the housing assembly and movable between a default position and a flow equalizing position, and (ii) a control chamber defined by the piston and the housing assembly. The remotely-actuatable valve is fluidly coupled to the control chamber and is configured to selectively adjust the fuel pressure therein. The controller is configured to command the remotely-actuatable valve to adjust the pressure within the control chamber such that the piston moves from the default position to the flow equalizing position after ignition of the GTE.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
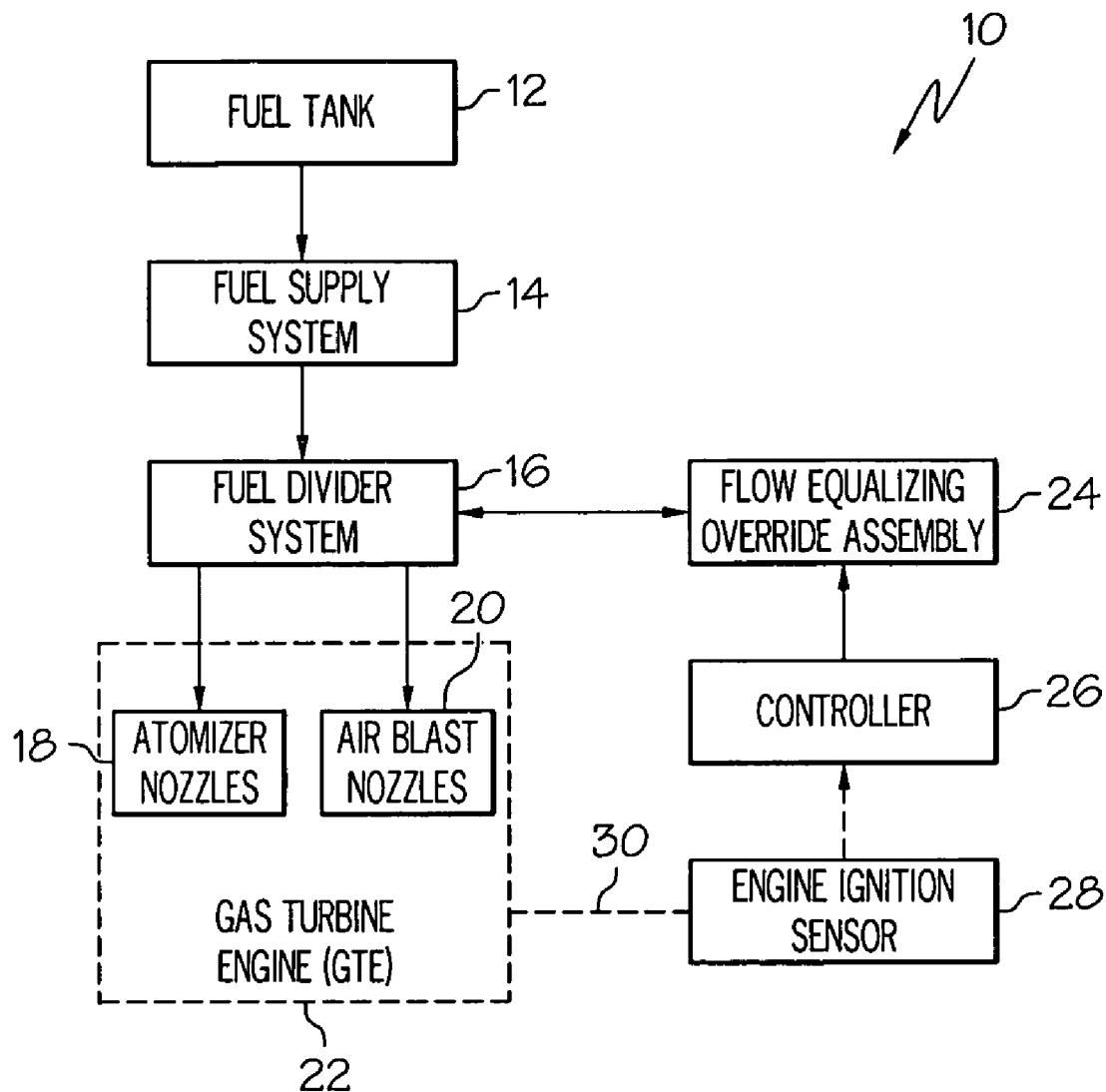
FIG. 1 is a simplified block diagram of an exemplary fuel control assembly suitable for use in conjunction with a gas turbine engine of the type commonly deployed on an aircraft.

FIG. 1 is a simplified block diagram of an exemplary fuel control assembly 10 suitable for use in conjunction with a gas turbine engine (GTE) 22 of the type commonly deployed on an aircraft. Fuel control assembly 10 includes a fuel tank 12, a burn fuel supply system 14, and a fuel divider system 16, which are coupled in flow series. Fuel divider system 16 is further coupled to at least two sets of nozzles mounted within a combustion chamber of GTE 22. For the purposes of illustration only, the GTE combustion chamber is depicted in FIG.

1 to include a primary set of atomizer nozzles 18 and a secondary set of air blast nozzles 20. Although illustrated as independent manifolds in FIG. 1, it will be appreciated that atomizer nozzles 18 may be combined with certain ones of air blast nozzles 20 to produce a number hybrid nozzles in actual implementations of fuel control assembly 10 and GTE 22.

During operation, fuel supply system 14 provides fuel divider system 16 with metered quantities of burn fuel withdrawn from fuel tank 12. Fuel divider system 16 then apportions the metered burn fuel received from fuel supply system 14 between atomizer nozzles 18 and air blast nozzles 20. Fuel supply system 14 may comprise various components suitable for providing fuel divider system 16 with metered burn fuel in this manner including, but not limited to, one or more boost pumps, high pressure pumps, filters, bypass valves, metering valves, pressurizing valves, and the like. Fuel supply systems suitable for use as fuel supply system 14 are well-known in the field and are thus not described further herein in the interest of concision.

Fuel divider system 16 is configured to bias up the pressure, and therefore the volume, of burn fuel supplied to atomizer nozzles 18 during engine lightoff. In the exemplary embodiment described below in conjunction with FIGS. 2-6, fuel divider system 16 is configured to bias up atomizer nozzle fuel flow as a function of total metered burn fuel received from fuel supply system 14. More specifically, in the below-described exemplary embodiment, fuel divider system 16 is configured to: (i) apportion a greater volume of fuel flow to atomizer nozzles 18 when receiving a relatively small volume of metered burn fuel from fuel supply system 14, and (ii) provide substantially equal flow to atomizer nozzles 18 and air blast nozzles 20 when receiving moderate to high volumes of metered burn fuel from fuel supply system 14. In this manner, fuel divider system 16 biases up fuel flow to atomizer nozzles 18 during engine lightoff conditions, while providing an equalized flow to atomizer nozzles 18 and to air blast nozzles 20 during moderate to high flow engine run conditions, such as engine cruise. However, when operating independently, fuel divider system 16 may also undesirably bias up the pressure of the burn fuel supplied to atomizer nozzles 18 during certain post start-up conditions, such as flight idle, wherein relatively little burn fuel is received from fuel supply system 14. For this reason, exemplary fuel control assembly 10 further comprises a flow equalizing override assembly 24, a controller 26 (e.g., a full authority digital engine controller), and an engine ignition sensor 28. Override assembly 24 is coupled for bi-directional fluid communication with, and may be structurally integrated into, fuel divider system 16. Controller 26 is operatively coupled to override assembly 24 and to engine ignition sensor 28, which monitors one or more parameters indicative of GTE ignition (indicated in FIG. 1 by dashed line 30). When engine ignition sensor 28 detects ignition of GTE 22, controller 26 activates override assembly 24. When activated by controller 26, flow equalizing override assembly 24 overrides the typical fuel distribution scheme of fuel divider system 16 and instead causes fuel divider system 16 to provide substantially equalized burn fuel flow to atomizer nozzles 18 and to air blast nozzles 20 regardless of the volume of metered burn fuel flow received from fuel supply system 14. Thus, when overridden by override assembly 24 in this manner, fuel divider system 16 will provide equal flow to atomizer nozzles 18 and to air blast nozzles 20 during all post start-up conditions including during low flow post start-up conditions, such as flight idle. Furthermore, in embodiments wherein fuel divider system 16 includes an ecology valve, override assembly 24 prevents ecology valve movement until override assembly 24 is activated by controller 26 subsequent to GTE ignition.

An exemplary embodiment of fuel divider system 14 and flow equalizing override assembly 24 will now be described in conjunction with FIGS. 2-6. Throughout the following description, the following acronyms are utilized to denote various pressures appearing within system 14 and override assembly 24:

| | |
|---|---|
| P2 | Pressurizing Valve Inlet Pressure |
| P3 | Fuel Divider Valve Inlet Pressure |
| PAT | Burn Fuel Flow Pressure to Atomizer Nozzles |
| PAB | Burn Fuel Flow Pressure to Air Blast Nozzles |
| PBFN | Total Burn Fuel Pressure |
| PO | Pressurizing Valve Reference Pressure |
| PXE | Ecology Valve Control Pressure |

FIGS. 2-6 illustrate are cross-sectional views of fuel divider system 16 and override assembly 24 in accordance with an exemplary embodiment. In the illustrated example, fuel divider system 16 and override assembly 24 are incorporated into a single housing assembly 32. Although illustrated as a unitary body in FIGS. 2-6, housing assembly 32 may include multiple individual housing components, which may or may not be rigidly joined together. A flow passage network 34 is formed through housing assembly 32. Flow passage network 34 includes a number of flow passages 34-1, 34-2 . . . 34-7; an inlet 36; a primary outlet 38; a secondary outlet 40; and a ecology valve control port 42. Primary outlet 38 is conveniently fluidly coupled to a primary set of nozzles, such as atomizer nozzles 18 (FIG. 1); and secondary outlet 40 is conveniently fluidly coupled to a secondary set of nozzles, such as air blast nozzles 20 (FIG. 1). A first connecting conduit 44 fluidly couples inlet 36 to a fuel pressurizing valve 46, which may be included in fuel supply system 14 (FIG. 1). Similarly, a second connecting conduit 50 fluidly couples ecology valve control port 42 to aircraft fuel tank 12 (FIG. 1) through one or more components of fuel divider system 16. For example, and as indicated in FIGS. 2-6, ecology valve control port 42 may be fluidly coupled to an annular chamber 48 provided in pressurizing valve 46, which may, in turn, be fluidly coupled to aircraft fuel tank 12 (FIG. 1).

Exemplary override assembly 24 includes two main valves, namely, a first fuel divider (FD) valve 52 and a remotely-actuatable valve 54. Exemplary fuel divider system 16 includes three valves; i.e., a second fuel divider (FD) valve 56, an ecology valve 58, and a check valve 60. First FD valve 52, second FD valve 56, remotely-actuatable valve 54, and ecology valve 58 are each formed to include multiple ports. In the illustrated example, first FD valve 52 includes first, second, third, fourth, fifth, sixth, and seventh ports 62, 64, 66, 68, 70, 72, and 74; second FD valve 56 includes first, second, third, fourth, and fifth ports 76, 78, 80, 82, and 84; remotely-actuatable valve 54 includes first, second, and third ports 86, 88, and 90; and, lastly, ecology valve 58 includes first, second, and third ports 92, 94, and 96. Although fuel divider system 16 and fuel equalizing override assembly 24 are shown in two dimensional cross-section in FIGS. 2-6, it will be noted by the skilled practitioner that port 68 of first FD valve 52, ports 80 and 82 of second FD valve 56, and ports 94 and 96 of ecology valve 58 are each defined, at least in part, by a substantially annular cutout formed in an inner surface of housing assembly 32.

The various ports of FD valves 52 and 56, remotely-actuatable valve 54, and ecology valve 58 are fluidly coupled to each other, to inlet 36, to primary outlet 38, to secondary outlet 40, and to check valve 60 via various flow passages included in flow passage network 34. Referring initially to first FD valve 52, port 62 is fluidly coupled to port 90 of remotely-actuatable valve 54 and to port 78 of second FD valve 56 via flow passage 34-1; port 64 is fluidly coupled to the outlet of check valve 60 and to port 92 of ecology valve 58 via flow passage 34-2; port 66 is fluidly coupled to ecology valve control port 42 and to the inlet of check valve 60 via flow passage 34-3; annular port 68 is fluidly coupled to annular port 82 of second FD valve 56 via flow passage 34-4; port 70 is fluidly coupled to annular port 94 of ecology valve 58 and to primary outlet 38 via flow passage 34-5; port 72 is fluidly coupled to ports 80 and 84 of second FD valve 56, to annular port 96 of ecology valve 58, and to port 86 of remotely-actuatable valve 54 via flow passage 34-6; and, lastly, port 74 is fluidly coupled to port 88 of remotely-actuatable valve 54 via flow passage 34-7. With respect to second FD valve 56, port 76 is fluidly coupled to inlet 36; port 78 is fluidly coupled to port 62 of first FD valve 52 and to port 90 of remotely-actuatable valve 54 via flow passage 34-1; annular port 80 is fluidly coupled to secondary outlet 40, as well as to port 72 of first FD valve 52, to annular port 96 of ecology valve 58, and to port 86 of remotely-actuatable valve 54 via flow passage 34-6; annular port 82 is fluidly coupled to annular port 68 of first FD valve 52 via flow passage 34-4; and port 84 is fluidly coupled to port 72 of first FD valve 52, to annular port 96 of ecology valve 58, and to port 86 of remotely-actuatable valve 54 via flow passage 34-6. Finally, the various ports of remotely-actuatable valve 54, ecology valve 58, and check valve 60 are fluidly coupled in the above-described manner.

In the illustrated exemplary embodiment, first FD valve 52 comprises an FD piston 100 and an FD spring 102. FD piston 100 is slidably disposed within housing assembly 32 and movable between a default position (shown in FIGS. 2, 3, 5, and 6) and a flow equalizing position (shown in FIG. 4). FD piston 100 cooperates with housing assembly 32 to define a reference pressure chamber 104 and a control chamber 106. Reference pressure chamber 104 is fluidly coupled to flow passage 34-1 via port 62, and control chamber 106 is fluidly coupled to flow passage 34-7 via port 74. FD spring 102 is disposed within FD control chamber 106 and biases FD piston 100 toward the default position (FIGS. 2, 3, 5, and 6). If desired, one or more dynamic seals 107 may be disposed between FD piston 100 and an inner surface of housing assembly 32 to minimize burn fuel leakage between the various ports of first FD valve 52. As will be described more fully below, the translational position of FD piston 100 is generally determined by the forces exerted on FD piston by spring 102, the fuel within reference pressure chamber 104, the fuel pressure within FD control chamber 106. To help ensure that FD piston 100 moves in a smooth and controlled manner, one or more damping bleeds may be fluidly disposed upstream of FD control chamber 106; e.g., a damping bleed may be fluidly disposed within flow passage 34-6 as indicated in FIGS. 2-6 at 109. In the illustrated exemplary embodiment, damping bleed 109 is located in flow passage 34-6 to ensure that FD piston 100 moves in a smooth and controlled manner when translating to the flow equalizing position (FIG. 4), while flow passage 34-7 is left substantially unrestricted to allow FD piston 100 to return to the flow biasing position (FIGS. 2, 3, 5, and 6). This allows the system to quickly return to startup mode should an engine stall occur.

Remotely-actuatable valve 54 may comprise any pneumatic, hydraulic, or electric device suitable for: (i) normally porting a predetermined high pressure to FD control chamber 106, and (ii) porting a predetermined low pressure to FD control chamber 106 when actuated by controller 26 (FIG. 1). In the illustrated exemplary embodiment, remotely-actuatable valve 54 comprises a solenoid 110, which is electrically coupled to controller 26 (FIG. 1) by way of a solenoid connector 114, and a valve element 112 (e.g., a ball stopper), which is affixed to the end of a plunger included within solenoid 110. In a non-energized state, the plunger of solenoid 110 resides in a retracted position (shown in FIGS. 2, 3, 5, and 6), and valve element 112 directs pressurized fuel flow from port 90 to port 88. In so doing, remotely-actuatable valve 54 routes a predetermined high pressure to FD control chamber 106. In a preferred embodiment, the predetermined high pressure is substantially equivalent to the total fuel pressure appearing at primary outlet 38 and at secondary outlet 40 ("PBFN" as labeled in FIGS. 3 and 6). When energized by controller 26, the plunger of solenoid 110 extends (shown in FIG. 4), and valve element 112 moves into a position wherein fuel flow is directed from port 86 to port 88 and into FD control chamber 106. Thus, when solenoid 110 is in a non-energized state, remotely-actuatable valve 54 routes a predetermined low pressure to FD control chamber 106. In a preferred embodiment, the predetermined low pressure is substantially equivalent to the fuel pressure appearing at secondary outlet 40 ("PAB" as labeled in FIG. 4).

Figure 2:
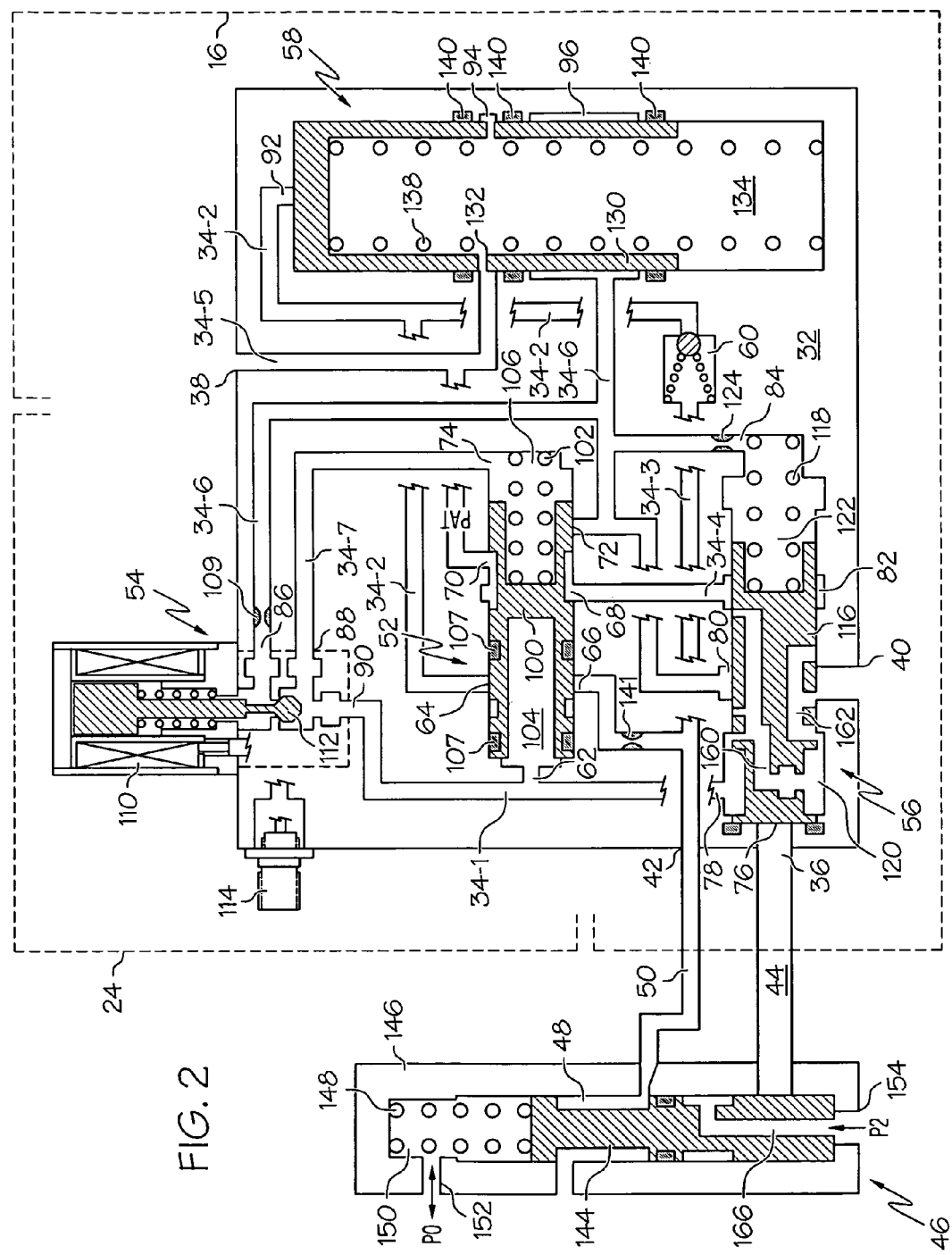
FIGS. 2-5 are simplified cross-sectional views of a flow equalizing override assembly, a fuel divider system, and a pressurizing valve in various stages of routine operation in accordance with an exemplary embodiment.

As does first FD valve 52, second FD valve 56 includes an FD piston 116 and a FD spring 118. FD piston 116 cooperates with housing assembly 32 to define an inlet chamber 120 and a spring cavity 122, which is fluidly coupled to flow passage 34-6 via port 84. FD piston 116 is slidably disposed within housing assembly 32 and movable amongst at least three positions: (i) a flow blocking position (shown in FIGS. 2 and 5) wherein FD piston 116 substantially prevents burn fuel flow from inlet 36 to primary outlet 38 and to secondary outlet 40, (ii) a flow biasing position (shown in FIGS. 3 and 4) wherein FD piston 116 permits substantially unrestricted fuel flow from inlet 36 to primary outlet 38 and restricted fuel flow from inlet 36 to secondary outlet 40, and (iii) a flow equalizing position (shown in FIG. 6) wherein FD piston 116 permits substantially unrestricted fuel flow from inlet 36 to primary outlet 38 and to secondary outlet 40. As appearing herein, the phrase "substantially unrestricted fuel flow" denotes that FD piston 116 that has moved to a position wherein FD piston 116 generally provides the least amount of impedance to fuel flow relative to the amount of impedance provided by FD piston 116 in alternative positions. FD spring 118 resides within spring cavity 122 and biases FD piston 116 toward the flow blocking position (FIG. 2). To help ensure that FD piston 116 moves in a smooth and controlled manner, a damping bleed may fluidly disposed within flow passage 34-6 as indicated in FIGS. 2-5 at 124.

Figure 3:
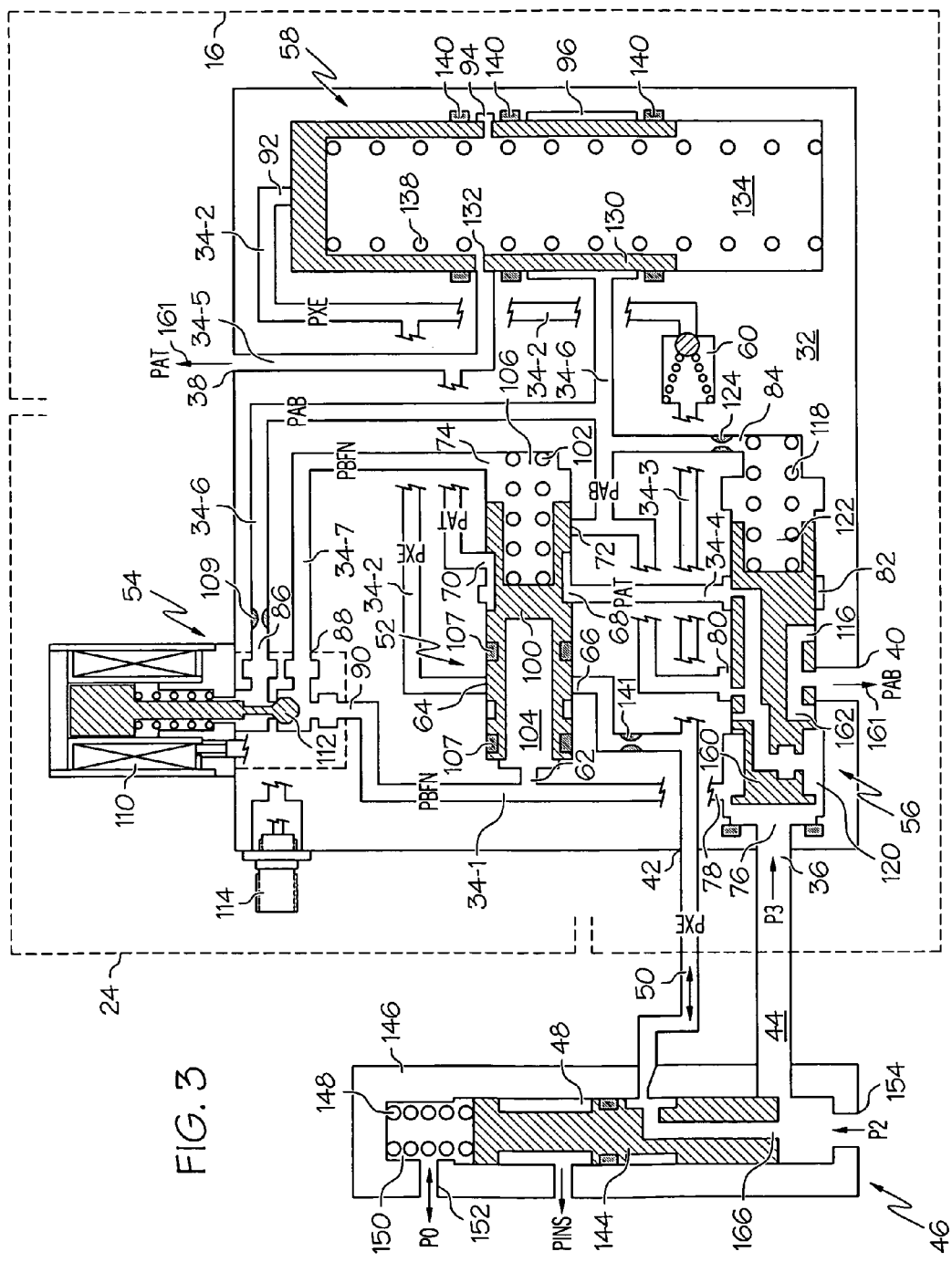

In the illustrated exemplary embodiment, ecology valve 58 includes an ecology valve (EV) piston 130 having one or more sidewall openings 132 formed therethrough; e.g., a plurality of sidewall openings 132 may be angularly spaced around a circumferential section of EV piston 130. EV piston 130 is slidably disposed within housing assembly 32 and movable between a fuel storage position (shown in FIGS. 2 and 3) and a fuel return position (shown in FIGS. 4 and 5). EV piston 130 cooperates with housing assembly 32 to define a fuel storage chamber 134 and an EV control chamber 136 (shown and labeled in FIGS. 4 and 5). An EV spring 138 is disposed within fuel storage chamber 134 and biases EV piston 130 toward the fuel storage position (FIGS. 2 and 3). As was the case with first FD valve 52, one or more dynamic seals 140 may be disposed between EV piston 130 and an inner surface of housing assembly 32 to minimize burn fuel leakage between ports 92, 94, and 96 of ecology valve 58. Again, one or more damping bleeds may be fluidly disposed upstream of EV control chamber 136 to help ensure that EV piston 130 moves in a smooth and controlled manner; e.g., a damping bleed may be fluidly disposed within flow passage 34-3 as indicated in FIGS. 2-6 at 141.

Figure 4:
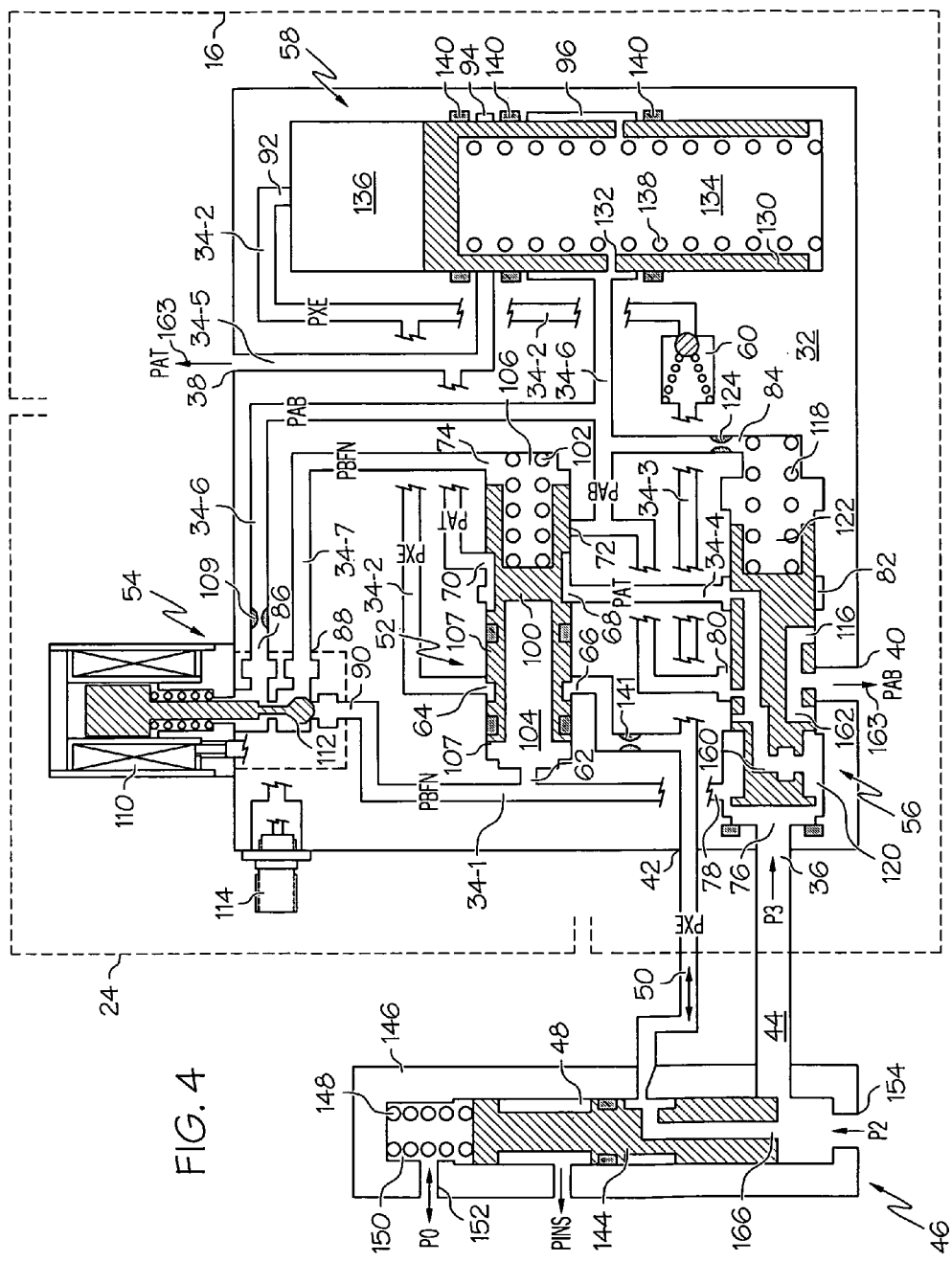
Figure 5:
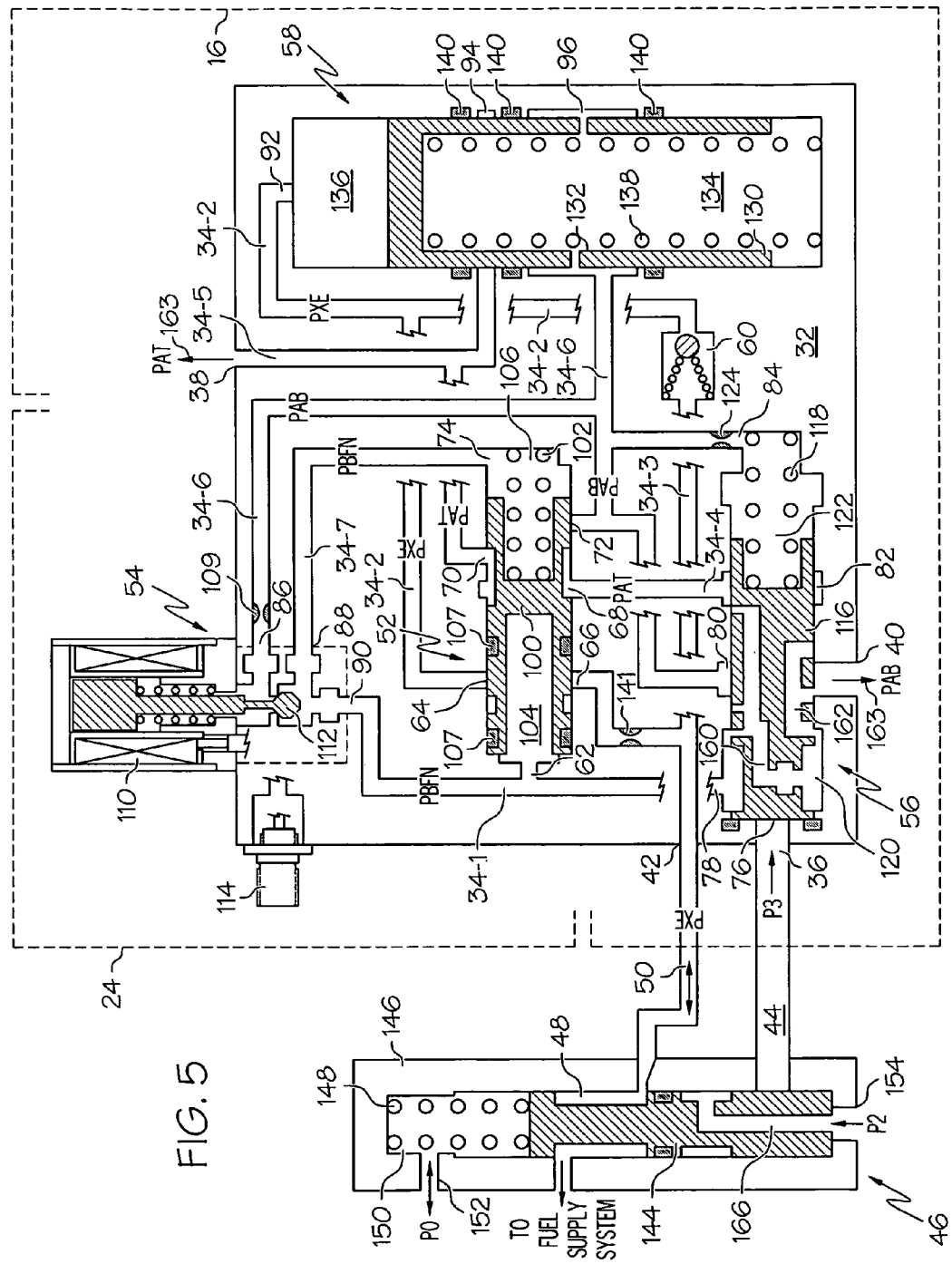

During operation, fuel pressurizing valve 46 supplies pressurized burn fuel to inlet 36 and ecology valve control port 42 of housing assembly 32. Fuel pressurizing valve 46 may comprise any device suitable for providing inlet 36 and control port 42 with pressurized burn fuel in this manner. In the illustrated exemplary embodiment, fuel pressurizing valve 36 includes a pressurizing valve (PV) piston 144 slidably mounted within a PV housing 146 and having a longitudinal channel 166 formed therethrough. A PV spring 148 is disposed within a spring cavity 150 provided within PV housing 146 and biases PV piston 144 toward a closed position (shown in FIGS. 2 and 6). A port 152 provided through a sidewall of PV housing 146 enables fluid communication between spring cavity 150 and a reference pressure source ("PO"). An inlet 154 is formed through PV housing 146 and receives metered burn fuel from a fuel supply system, such as fuel supply system 14 described above in conjunction with FIG. 1. When the force exerted on PV piston 144 by the metered burn fuel supplied to inlet 152 exceeds the cumulative force exerted on piston 144 by spring 148 and the burn fuel within spring cavity 150, PV piston 144 moves toward spring 148 and into an open position (FIGS. 3-5). Pressurized burn fuel is thus permitted to flow through pressurizing valve 46, through connecting conduits 44 and 50, and into inlet 36 and control port 42 of housing assembly 32.

Routine Operation of the Exemplary Fuel Divider System and Override Assembly

The manner in which fuel divider system 16 and flow equalizing override assembly 24 may function during routine operation will now be described in conjunction with FIGS. 2-5. Referring initially to FIG. 2, fuel divider system 16 and override assembly 24 are illustrated prior to engine start-up. At this juncture, little to no metered burn fuel is provided to inlet 154 of pressurizing valve 46. The pressure ("P2") of the metered burn fuel supplied to inlet 154 is thus insufficient to overcome the bias force exerted on PV piston 144 by PV spring 148, and PV piston 144 remains in the closed position. FD piston 116 is likewise maintained in the flow blocking position by FD spring 118, and little to no burn fuel is permitted to flow through primary outlet 38 to atomizer nozzles 18 (FIG. 1) or through secondary outlet 40 to air blast nozzles 20 (FIG. 1). Furthermore, prior to engine start-up, EV piston 130 of ecology valve 58 is maintained in the fuel storage position by EV spring 138. It should be noted that, when moving into the fuel storage position illustrated in FIG. 2, ecology valve 58 removed a predetermined volume of fuel from the engine fuel manifold. This removed fuel is now temporarily stored within fuel storage chamber 134.

Turning now to FIG. 3, fuel divider system 16 and override assembly 24 are illustrated during GTE start-up. The volume of burn fuel supplied to inlet 154 of pressurizing valve, and therefore the fuel pressure appearing at inlet 154 ("P2"), has increased to a level sufficient to overcome the bias force of PV spring 148 and move PV piston 144 into an open position. This permitted metered burn fuel to flow through pressurizing valve 46, through connecting conduit 44, through inlet 36 of housing assembly 32, and into port 76 of second FD valve 56 and exert a force on the exposed face of FD piston 116 in the direction of FD spring 118. As the pressure of the burn fuel supplied to port 76 ("P3") increased, the force exerted on FD piston 116 by the burn fuel supplied to port 76 eventually exceeded the cumulative force exerted on FD piston 116 by spring 118 and the burn fuel within spring cavity 122. FD piston 116 has thus lifted from its seat and moved into the flow biasing position illustrated in FIG. 3.

Now in the flow biasing position, FD piston 116 permits burn fuel to fill inlet chamber 120. Notably, the fuel pressure within fuel inlet chamber 120, and thus the fuel pressure routed to port 62 of first FD valve 52 and to port 90 of remotely-actuatable valve 54 by flow passage 34-1, represents the total burn fuel flow pressure available to atomizer and air blast nozzles 18 and 20 ("PBFN" as labeled in FIGS. 3, 4, and 6). From inlet chamber 120, the pressurized burn fuel flows into a first channel 160 provided through FD piston 116. When FD piston 116 is in the flow biasing position, first and second outlets of channel 160 align with annular ports 80 and 82, respectively. The first and second outlets of channel 160 cooperate with ports 80 and 82 such that burn fuel flows: (i) into flow passage 34-4, into port 68 of first FD valve 52, around FD piston 100, through port 70 of first FD valve 52, into flow passage 34-5, through primary outlet 38, and to the atomizer nozzles 18 (FIG. 1) with minimal impedance, and (ii) into port 80, through secondary outlet 40, and to air blast nozzles 20 (FIG. 1) with a predetermined amount of impedance greater than the minimal impedance. The burn fuel pressure appearing at primary outlet 38 ("PAT") is consequently biased up relative to the burn fuel pressure appearing at secondary outlet 40 ("PAB"), and volume of fuel flow through primary outlet 38 to atomizer nozzles 18 (FIG. 1) is increased relative to the volume of fuel flow through secondary outlet 40 to air blast nozzles 20 (indicated in FIG. 3 by arrows 161).

With continued reference to FIG. 3, solenoid 110 of remotely-actuatable valve 54 is maintained in a de-energized state prior to and during engine start-up. When solenoid 110 is in such a de-energized state, valve element 112 routes fuel flow received from port 90 through port 88 and into FD control chamber 106. Thus, as stated above, remotely-actuatable valve 54 ports a predetermined high pressure (e.g., "PBFN") to FD control chamber 106 prior to activation. It can be seen in FIG. 3 that reference pressure chamber 104 is also fluidly coupled to the predetermined high pressure source (e.g., "PBFN") via flow passage 34-1. The forces exerted on FD piston 100 by the fuel contained within FD control chamber 106 and that contained within reference pressure chamber 104 consequently cancel, and FD piston 100 is maintained in the default position (FIG. 3) by spring 102.

When in the default position illustrated in FIG. 3, FD piston 100 provides little to no impedance to fuel flow from port 68 to port 70 and, more generally, from inlet 36 to primary outlet 38. FD piston 100 does, however, block fuel flow from port 72 to port 70 and from port 66 to port 64. By blocking fuel flow from port 66 to port 64, FD piston 100 restricts the flow of pressurized fuel into EV control chamber 136. EV piston 130 is thus maintained in the fuel storage position (shown in FIGS. 2 and 3) by forces exerted thereon by EV spring 138 and the fuel contained within fuel storage chamber 134.

FIG. 4 illustrates fuel divider system 16 and flow equalizing override assembly 24 after engine start-up. Engine ignition sensor 28 has detected GTE ignition, and controller 26 has energized solenoid 110 accordingly. Now energized, solenoid 110 has moved valve element 112 into a position wherein valve element 112 routes pressurized fuel flow received from port 86 to port 88 and into FD control chamber 106. As previously explained, this results in a predetermined low pressure, this case the pressure appearing at secondary outlet 40 ("PAB"), being ported into FD control chamber 106 by remotely-actuatable valve 112. The fuel pressure within FD control chamber 106 thus decreases from the total burn fuel flow pressure available to atomizer and air blast nozzles 18 and 20 ("PBFN") to the fuel pressure appearing at secondary outlet 40 ("PAB"), while the fuel pressure within reference pressure chamber 104 remains substantially equivalent to PBFN. The force exerted on FD piston 100 by the fuel within reference pressure chamber 104 consequently exceeds the cumulative force exerted on FD piston 100 by the fuel within FD control chamber 106 and FD spring 102, and FD piston 100 moves from the default position into the flow equalizing position shown in FIG. 4.

When in the flow equalizing position, FD piston 100 blocks fuel flow from port 68 to 70 and permits substantially unrestricted fluid communication between ports 72 and 70. From port 80 of second FD valve 56, burn fuel is permitted to flow: (i) through secondary outlet 40, and to air blast nozzles 20 (FIG. 1) with little to no restriction, and (ii) through flow passage 34-6, into port 72 of first FD valve 52, around FD piston 100, into port 70 of first FD valve 52, through flow passage 34-5, through primary outlet 38, and ultimately to atomizers nozzles 18 (FIG. 1) with little to no restriction. The pressure of the burn fuel supplied to secondary outlet 40 ("PAB") thus equalizes with the pressure of the fuel supplied to primary outlet 38 ("PAT"), and fuel divider system 16 provides a substantially equal flow output to primary outlet 38 and secondary outlet 40 (indicated in FIG. 4 by arrows 163). In this manner, controller 26 (FIG. 1) and flow equalizing override assembly 24 cooperate to equalize the burn fuel output of fuel divider system 16 supplied to atomizer nozzles 18 and air blast nozzles 20 immediately after GTE start-up. Notably, the fuel output of fuel divider system 16 to atomizer nozzles 18 and air blast nozzles 20 remains equalized irregardless of the volume of metered burn fuel supplied to fuel divider system 16 by fuel supply system 14 (FIG. 1). An even spray pattern within the combustion chamber of GTE 22 (FIG. 1) is therefore achieved even during post start-up low flow conditions, such as flight idle.

Referring still to FIG. 4, PV piston 144 has moved to a position wherein channel 166 permits pressurized fluid to flow through connecting conduit 50 and into ecology valve control port 42 of fuel divider system 16. Pressurized fuel is thus permitted to flow through flow passage 34-3, into port 66 of first FD valve 52. FD piston 100, now in the flow equalizing position, permits fuel flow from port 66 to port 64 and thus through flow passage 34-2 and into EV control chamber 136. The pressurized fuel within EV control chamber 136 ("PXE") exerts a force on EV piston 130 sufficient to overcome the cumulative force exerted on EV piston 130 by EV spring 138 and the burn fuel held within fuel storage chamber 134. EV piston 130 thus moves toward the fuel return position (shown in FIG. 4), and openings 132 align with annular port 96. As EV piston 130 moves toward the fuel return position, a portion of the fuel held within fuel storage chamber 134 is forced into annular ports 94 and 96, flows through flow passages 34-5 and 34-6, and exits fuel divider system 16 via outlets 38 and 40. This burn fuel is then directed into the GTE combustion chamber by air blast nozzles 20 (FIG. 1) for combustion. Notably, at any given interval, the volume of fuel reintroduced from fuel storage chamber 134 is substantially equivalent to the volume of fuel received by EV control chamber 136; thus, the reintroduction of burn fuel by ecology valve 58 has little to no effect on net metered fuel flow through fuel divider system 16. Override assembly 24 thus prevents movement of EV piston 130 until remotely-actuatable valve 54 is actuated (e.g., solenoid 110 is energized by controller 26 shown in FIG. 1) subsequent to GTE start-up thereby avoiding the premature return of previously-withdrawn burn fuel into the combustion chamber of GTE 22 (FIG. 1) to avoid compromising optimal engine startup burn flow conditions.

FIG. 5 illustrates fuel divider system 16 and flow equalizing override assembly 24 immediately after engine shutdown. At this juncture, metered burn fuel is no longer provided to inlet 154 of pressurizing valve 46. Solenoid 110 has been de-energized, and FD piston 100 has returned to the default position. The back pressure exerted on check valve 60 has decreased permitting check valve 60 to open. Under the influence of EV spring 138 expands, EV piston 130 now moves toward the fuel storage position shown in FIGS. 2 and 3. As EV piston 130 moves toward the fuel storage position (FIGS. 2 and 3), a predetermined quantity to flow from the fuel engine manifold into fuel storage chamber 134. At the same time, burn fuel flows from EV control chamber 136, through check valve 60, through connecting conduit 50, through annular chamber 48 of pressurizing valve 46, and ultimately returns to fuel supply system 14. When engine operation is again initiated, fuel supply system 14 supplies this burn fuel to fuel divider system 16, which then apportions the burn fuel between primary outlet 28 and secondary outlet 30 in the above-described manner.

Failsafe Operation of the Exemplary Fuel Divider System and Override Assembly

Figure 6:
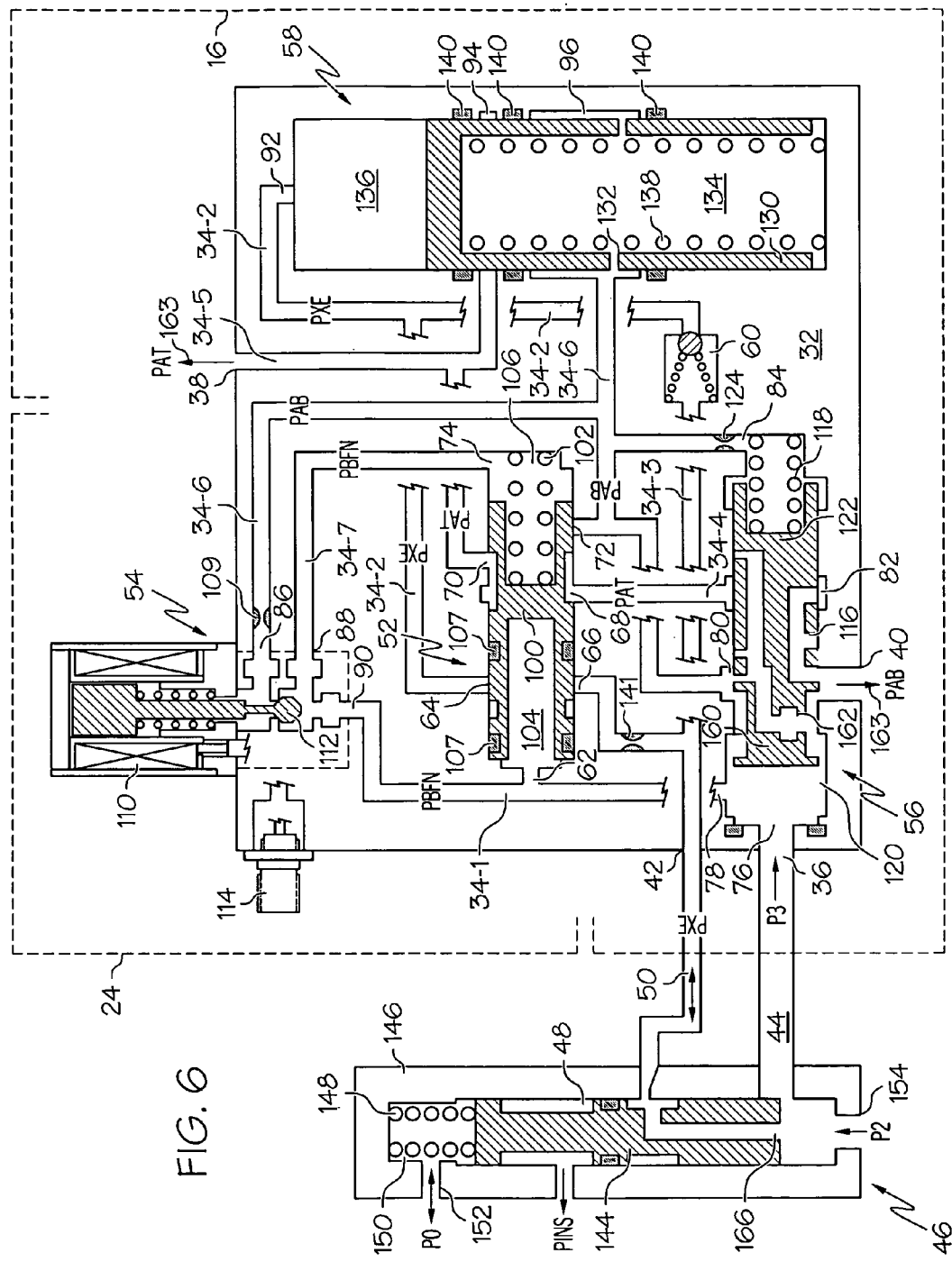
FIG. 6 is a simplified cross-sectional view of the flow equalizing override assembly, the fuel divider system, and the pressurizing valve shown in FIGS. 2-5 illustrating a failsafe mode.

Although by no means necessary, FD piston 116 of second FD valve 56 may be configured to move into a flow equalizing position during moderate to high flow post start-up conditions and thereby provide a failsafe measure in the unlikely event of override assembly failure. Further emphasizing this point, FIG. 6 illustrates fuel divider system 16 and flow equalizing override assembly 24 during an exemplary failsafe mode. Here, engine ignition has been achieved; however, FD piston 100 remains in the default position due to a failure occurring within solenoid 110 or controller 26. The force exerted on FD piston 116 by the burn fuel supplied to port 76 has increased to a level sufficient to further compress FD spring 118 and move FD piston 116 into the flow equalizing position illustrated in FIG. 6. Burn fuel entering inlet chamber 120 is now permitted to flow around the head of FD piston 116, into annular port 80, through secondary outlet 40, and to air blast nozzles 20 with little to no restriction. Similarly, a second channel 162 provided through FD piston 116 permits burn fuel flow from annular port 80 into annular port 82, through flow passage 34-4, into port 68 of first FD valve 52, around FD piston 100, into port 70 of first FD valve 52, through flow passage 34-5, through primary outlet 38, and to atomizer nozzles 18 with little to no restriction. The fuel output of fuel divider system 16 is thus equalized during moderate to high engine run conditions, such as engine cruise, despite the failure of override assembly 24. In this failsafe mode, pressurized flow supplied to ecology valve control port 42 will slowly flow from annular port 66 to annular port 64 around FD piston 100, and thus through flow passage 34-2 and into EV control chamber 136, thereby causing ecology valve 58 to transition to the fuel return position, albeit at a slower rate than ecology valve 58 will transition to the fuel return position in the normal operating mode.

It should thus be appreciated that there has been provided an exemplary embodiment of a flow equalizing override assembly capable of being remotely actuated at a desired time (e.g., immediately after GTE ignition) to equalize the flow output of a fuel divider system and thereby provide equalized flow to primary and secondary nozzles during post start-up conditions including low flow post start-up conditions, such as flight idle. It should further be appreciated that, in the above-described exemplary embodiment, the override assembly was configured to prevent ecology valve movement until the override assembly has been activated subsequent to, and preferably immediately after, GTE start-up. Although, described above in conjunction with a fuel divider system including an ecology valve and a fuel divider valve providing a failsafe mode, embodiments of the override assembly may be utilized with various other types of flow divider systems, whether or not such systems employ an ecology valve or a fuel divider valve having a failsafe mode. For example, the override assembly may be utilized in conjunction with a flow divider system including a simplified fuel divider valve (e.g., a spring-loaded piston lacking channels therethrough) that provides a pressurizing means, but that does not provide a failsafe mode. In this case, a failsafe mode may instead be provided by, for example, a redundant device, such as a second remotely-actuatable valve.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A flow equalizing override assembly for use in conjunction with a fuel supply source, a gas turbine engine (GTE), and a fuel divider system fluidly coupled between the fuel supply source and the GTE, the GTE including first and second sets of nozzles, the fuel divider system configured to normally bias-up fuel flow to the first set of nozzles as compared to the fuel flow to the second set of nozzles as a function of the volume of fuel supplied to the fuel divider system by the fuel supply source, the flow equalizing override assembly comprising:
   a housing assembly;
   a fuel divider (FD) valve, comprising:
     a piston slidably disposed within the housing assembly and movable between a default position and a flow equalizing position; and
     a control chamber defined by the piston and the housing assembly;
   a remotely-controllable valve fluidly coupled to the control chamber and configured to selectively adjust the fuel pressure therein; and
   an electronic controller operatively coupled to the remotely-controllable valve, the electronic controller configured to send a command signal to the remotely-controllable valve to adjust the pressure within the control chamber such that the piston moves from the default position to the flow equalizing position after ignition of the GTE to override normal operation of the fuel divider system such that substantially equalized fuel flow is provided to the first and second sets of nozzles substantially independently of the volume of fuel supplied to the fuel divider system by the fuel supply store.

2. A flow equalizing override assembly according to claim 1 wherein the remotely-controllable valve is configured to route: (i) fuel at a first predetermined pressure to the control chamber in a first position, and (ii) fuel at a second predetermined pressure to the control chamber in a second position.

3. A flow equalizing override assembly according to claim 2 wherein the controller is configured to move the remotely-controllable valve from the first position to the second position after ignition of the GTE.

4. A flow equalizing override assembly according to claim 2 wherein the fuel divider system includes a primary outlet and a secondary outlet, and wherein the first predetermined pressure is substantially equivalent to the total fuel pressure appearing at the primary outlet and at the secondary outlet.

5. A flow equalizing override assembly according to claim 4 wherein the second predetermined pressure is substantially equivalent to the fuel pressure appearing at the secondary outlet.

6. A flow equalizing override assembly according to claim 2 further comprising a reference pressure chamber defined by the piston and the housing assembly, the fuel within the reference pressure chamber acting on the piston in opposition to the fuel within control chamber.

7. A flow equalizing override assembly according to claim 6 further comprising a flow passage fluidly coupling the reference pressure chamber to the first predetermined pressure.

8. A flow equalizing override assembly according to claim 1 wherein the remotely-controllable valve comprises a solenoid.

9. A flow equalizing override assembly according to claim 1 wherein the FD valve further comprises a spring biasing the piston toward the flow equalizing position.

10. A flow equalizing override assembly according to claim 9 wherein the spring is disposed within the control chamber.

11. A flow equalizing override assembly according to claim 1 wherein the fuel divider system further comprises an ecology valve including an ecology valve (EV) control chamber, the FD valve fluidly coupled to the EV control chamber.

12. A flow equalizing override assembly according to claim 1 further comprising a damping bleed fluidly coupled between the remotely-controllable valve and the control chamber of the FD valve to dampen fuel flow to the control chamber of the FD valve.

13. A flow equalizing override assembly according to claim 12 wherein the FD valve: (i) substantially prevents fuel flow to the EV control chamber in the default position, and (ii) permits fuel flow to the EV control chamber in the flow equalizing position.

14. A flow equalizing override assembly for use in conjunction with a gas turbine engine (GTE), a fuel divider system including a primary outlet and a secondary outlet, and a fuel supply system fluidly coupled to the fuel divider system, the GTE including first and second sets of nozzles, and the fuel divider system configured to normally bias-up fuel flow to the first set of nozzles as compared to the fuel flow to the second set of nozzles as a function of the total volume of fuel supplied to the fuel supply system, the flow equalizing override assembly comprising:
   a housing assembly;
   a fuel divider (FD) valve, comprising:
     a piston slidably disposed within the housing assembly and movable between a default position and a flow equalizing position; and
     a control chamber defined by the piston and the housing assembly;
   a remotely-controllable valve fluidly configured to route: (i) fuel at a predetermined high pressure to the control chamber in a first position, and (ii) fuel at a predetermined low pressure to the control chamber in a second position;
   an engine ignition sensor configured to monitor a parameter indicative of GTE ignition; and
   an electronic controller coupled to the engine ignition sensor and to the remotely-controllable valve, the electronic controller commanding the remotely-controllable valve to move from the first position to the second position when the engine ignition sensor detects GTE ignition to override normal operation of the fuel divider system such that substantially equalized burn fuel flow is provided to the first and second sets of nozzles substantially independently of the volume of fuel supplied to the fuel divider system by the fuel supply source.

15. A flow equalizing override assembly according to claim 14 wherein the FD valve resides in: (i) the default position when the remotely-controllable valve routes fuel at the predetermined high pressure to the control chamber, and (ii) the flow equalizing position when the remotely-controllable valve routes the predetermined low pressure to the control chamber.

16. A flow equalizing override assembly according to claim 14 wherein the remotely-controllable valve comprises:
   a first port fluidly coupled to the predetermined high pressure;
   a second port fluidly coupled to the predetermined low pressure; and
   a third port fluidly coupled to the control chamber.

17. A flow equalizing override assembly according to claim 16 wherein the remotely-controllable valve further comprises:
   a valve element disposed between the first port, the second port, and the third port; and
   a solenoid coupled to the controller and configured to selectively move the valve element between: (i) a first position wherein the valve element routes fuel flow from the first port to the third port, and (ii) a second position wherein the valve element routes fuel flow from the second port to the third port.

18. A flow equalizing override assembly for use in conjunction with a gas turbine engine (GTE) and a fuel divider system including a primary outlet and a secondary outlet, the fuel divider system normally biasing-up fuel discharged through the primary outlet relative to the secondary outlet as a function of the volume of fuel supplied to the fuel divider system by the fuel supply system, the flow equalizing override assembly comprising:
   a housing assembly;
   a fuel divider (FD) valve, comprising:
      a piston slidably disposed within the housing assembly and movable between: (i) a default position, and (ii) a flow equalizing position wherein the FD valve cooperates with the fuel divider system to provide substantially equal fuel flow to the primary outlet and to the secondary outlet; and
      a control chamber defined by the piston and the housing assembly, the piston configured to move from the default position to the flow equalizing position when the fuel pressure within the control chamber changes from a first predetermined pressure to a second predetermined pressure;
   a remotely-controllable valve coupled to the control chamber and movable between: (i) a first position wherein the remotely-controllable valve routes fuel at the first predetermined pressure to the control chamber, and (ii) a second position wherein the remotely-controllable valve routes fuel at the second predetermined pressure to the control chamber; and
   an electronic controller operatively coupled to the remotely-controllable valve, the electronic controller configured to cause the remotely-controllable valve to move from the first position to the second position at a desired time after ignition of the GTE to override normal operation of the fuel divider system and provide substantially equalized fuel flow through the primary and secondary outlets substantially independently of the volume of fuel supplied to the fuel divider system by the fuel supply source.

19. A flow equalizing override assembly according to claim 18 further comprising a damping bleed fluidly coupled between the remotely-controllable valve and the control chamber of the FD valve, the damping bleed configured to dampen fuel flow to the control chamber of the FD valve to regulate the rate at which the piston transitions from the default position to the flow equalizing position.

* * * * *